Patented Mar. 23, 1948

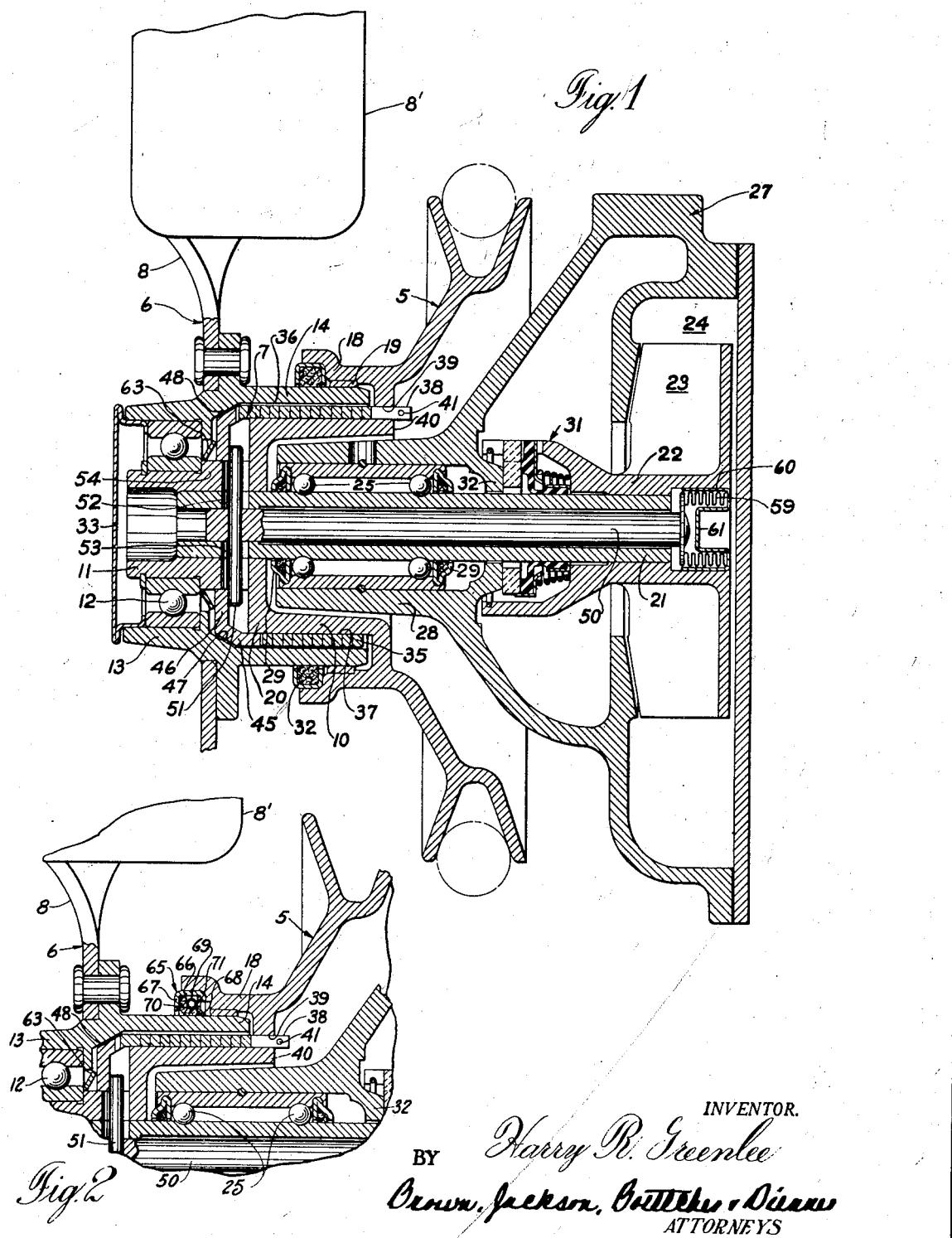

2,438,161

UNITED STATES PATENT OFFICE 2,438,161

TEMPERATURE CONTROL FOR ENGINES

Harry R. Greenlee, Indianapolis, Ind., assignor to The Studebaker Corporation, South Bend, Ind., a corporation of Delaware Application June 22, 1945, Serial No. 600,855

14 Claims. (Cl. 123—178)

My present invention relates to an improvement in temperature control means for an engine, and more particularly to temperature control means including a thermostatically controlled clutch for controlling rotation of a fan for cooling fluid of a circulating cooling system of an internal combustion engine or the like in response to temperature of the cooling fluid.

In the operation of an internal combustion engine it is desirable under certain circumstances that the fan means for effecting cooling of the cooling fluid of the engine be rendered inoperative. For example, in starting an internal combustion engine in cold weather it is desirable that the fan be disengaged so that its cooling action will not prevent the engine from quickly reaching its most efficient operating temperature. The engine with the fan means disengaged will thus more quickly reach its operating temperature after which it may be desirable to effect operation of the fan to cause a stream of cooling air to flow through a radiator or the like through which the cooling fluid from the engine is caused to be circulated to maintain a predetermined operating temperature or as close thereto as other factors permit for most efficient operation of the engine.

It is further desirable that when an internal combustion engine does not require the fan means for cooling there would be no cold air stream to interrupt the uniform heat rise of manifolds and carburetion parts.

It is further desirable to provide a cooling system in which an internal combustion engine or the like does not require the fan means for effecting cooling of the cooling fluid, which may happen during air impact, cool surrounding temperature or the like, excess horsepower will not be utilized needlessly.

I have found that under normal conditions of operation that generally when the vehicle is moving at a rate of 40 miles per hour or more that the fan means is not necessary for effecting cooling of the cooling water of the circulatory system. In addition the continuous operation of the fan at such speed causes undue noise by its displacement of air and its increased vibration. The noises created by the displacement of air by the fans has been thought to be overcome by intentional arrangement of the fan blades in non-symmetrical relation so as to break up air stream noises. However this arrangement is not satisfactory since it puts the fan out of balance which obviously is not desirable from the standpoint of wear, and such arrangement further results in increased vibration of the fan. Thus it is further desirable to be able to disengage the fan from its driving means as often as is necessary to maintain the desired operating temperature in order to maintain at a minimum air noise and fan vibration.

It is an object of my invention therefore to provide means for controlling operation of a fan of an internal combustion engine or the like in response to the temperature of the cooling medium thereof.

A further object of my invention is to provide a driving means, a driven means carrying a fan for cooling the fluid in a circulatory system for an internal combustion engine or the like, and a means responsive to the temperature of the fluid in the circulatory system for actuating a clutch disposed between the driving and driven means to cause rotation of the fan at a predetermined temperature of the fluid in the circulatory system.

In the preferred form of my invention, I provide driving and driven members, the driving member being associated with a pump for circulating a cooling medium in a circulatory system of an internal combustion engine or the like and the driven member carrying a fan. A suitable thermally responsive means is positioned to be subject to the temperature of the cooling medium in the circulatory system for the engine, and when the temperature of the cooling medium reaches a predetermined degree, the thermally responsive means is caused to operate a clutch between the driving and driven members to cause rotation of the fan and effect cooling of the cooling medium of the circulatory system of the engine. If the temperature of the cooling medium in the circulatory system drops below the desired predetermined operating temperature, the thermally responsive means causes the clutch to disengage the driving and driven members so that the fan carried by the driven member is rendered ineffective. In this manner the cooling medium in the circulatory system may be maintained at the desired predetermined temperature for most efficient operation of the engine.

A feature of the preferred form of my invention resides in the provision of a clutch of the known coil spring type, which is adapted to be positioned between concentric friction or clutch surfaces of the driving and driven members with the thermally responsive means being operable to radially expand the clutch to clutch the members together for conjoint rotation, when the temperature of the cooling medium in the circulatory system for the engine exceeds the desired operating temperature.

A further preferred feature resides in providing the driving and driven members with spaced apart and overlapping clutch surfaces between which the coil spring clutch is disposed so that the mechanism occupies a small amount of space whereby it may be incorporated with a motor vehicle or the like without interfering with the compactness and design of the vehicle body.

A further preferred feature is in the provision of a thermally responsive means comprising a flexible bellows charged with a suitable expansible fluid, which bellows is adapted to be disposed in the pump chamber of a fluid circulatory system of the pressure type, and which is connected to a rod extending coaxially of the driving and driven members to be movable axially relative thereto upon expansion and contraction of the fluid in the bellows for controlling actuation of the clutch.

A further preferred feature is that when using a thermostatic means of the bellows type the bellows will be gas filled so that if the gas ever escaped the rigidity of the bellows convolutions would engage the clutching means and act as a safe guard to the engine cooling by causing the fan to operate all the time.

A still further preferred feature is in the provision of driving and driven members, the latter carrying a fan for directing air to cool the cooling medium in a fluid circulatory system for an internal combustion engine or the like, in which a coil spring clutch is positioned between the driving and driven members and secured at one end to one of these members with the other end of the coil spring clutch having a clutch plate associated therewith formed with a clutch surface for engaging a clutch surface on the driven member upon movement of a clutch rod axially by a thermally responsive means at a predetermined temperature of the fluid in the circulatory system for causing the coil spring clutch to expand radially to clutch the driving and driven members to each other.

A further preferred feature of another embodiment of my invention is in the provision of suitable means for creating a constant friction, such as a spring loaded oil seal, which will produce sufficient drag to rotate the fan or driven means slowly so that when clutch member couples the driving and driven members together it will eliminate the hazard of bent or distorted fan blades.

Other objects and advantages of my invention will appear from the detail description.

Now, in order to acquaint those skilled in the art with the manner of constructing and utilizing a device in accordance with my invention, I shall describe in connection with the acompanying drawing a preferred embodiment of my invention.

Figure 1 of the drawing is a vertical sectional view of a device constructed in accordance with my invention and the manner with which it may be incorporated with the forward end of the internal combustion engine; and Figure 2 is a detail partial sectional view of a modified form of my invention in which means is provided to maintain a constant frictionally engagement between the driving and driven members to slowly rotate the fan even though the clutch between the driving and driven members is disengaged.

In Figure 1 of the drawing I have shown a driving means 5 comprising in part a sheave or pulley which is adapted to have driving connection as by a belt with the crank shaft or other driving shaft of an internal combustion engine in a manner well known in the art. The driven means 6 comprises a fan 8, one blade 8' of which is shown in the drawing. A clutch 7 is disposed between the drive and driven means which is adapted to be actuated to cause rotation of the driven means 6 to cause air to flow through a radiator (not shown) or the like forming a part of a circulatory cooling system for the internal combustion engine, only the extreme forward portion of which is shown in the drawing. The circulatory system for the internal combustion engine may be of any known type which use water, for example, as a cooling medium.

The driving means 5 comprises an intermediate hub or sleeve portion 10 of substantially cup shape and a reduced cylindrical outer end portion 11 which is journaled in the bearing 12 disposed between the cylindrical end 11 and the forwardly extending annular sleeve 13 of the driven means 6. The driven means 6 comprises an inwardly or rearwardly extending annular sleeve 14 coaxial with an overlying hub or sleeve portion 10 of the driving means 5. The driving means 5 is also formed with an axially forwardly extending sleeve portion 18 spaced from and overlying the inner or rearward end of the sleeve portion 14 of the driven means 6. A ring bearing 19 is disposed between the annular sleeve 18 of the driving member 5 and the sleeve 14 of the driven means 6 so that the bearing 12 and bearing 19 provide bearing surfaces to rotatably support the driven means 6 coaxially of the driving means 5. A hollow sleeve or shaft 21 has its outer end portion extending through an opening in the closed end wall 20 of hub 10 and into the bore of the cylindrical extension 11, and at its inner or rearward end has a press fit with the hub portion 22 of an impeller 23 disposed in the pump chamber 24 formed in the pump housing 27 at the forward end of the internal combustion engine. The shaft 21 is rotatably mounted in a pair of ball bearing races 25 lying between the intermediate portion of the hollow shaft 21 and the collar 28 at the forward end of the pump housing 27. Suitable lubricant retaining seals 29 are provided for the bearings 25 and a known form of water and lubricant seal means 31 is arranged between the radially inwardly extending flange 32 at the inner end of collar 28 of the housing 27 and the outer or forward end of hub portion 22 of the impeller 23.

Also a packing ring 32 is positioned between the outer end of the sleeve 18 of the driving means 5 and the sleeve 14 of the driven means 6. An end or closure cap 33 fits within the annular outwardly extending sleeve 13 of the driven means 6.

The clutch 7 preferably comprises a coil spring 35 positioned between the inner cylindrical clutch surface 36 of the sleeve 14 of the driving means 6, and the external cylindrical clutch surface 37 of the hub or sleeve 10 of the driving means 5. The free end 38 of the coil spring extends through a suitable opening 39 provided therefor in the radially extending wall 40 of the driving means 5. A pin 41 extends transversely of the free end of the coil spring to prevent it from becoming disengaged from the driving means 5. At its other or outer end the coil spring clutch is formed with a plate member 45 having a radially inwardly extending flange 46 and a tapered outer friction surface 47 adapted to have clutching engagement with the correspondingly forward internal friction surface 48 of the sleeve portion 14 of the driven means 6. A rod or shaft 50 extends through the hollow sleeve 21 and at its outer end carries a cross pin 51 which extends through transverse openings 52 and 53 in the shaft 21 and the intermediate cylindrical portion 54 between the hub or sleeve 10 and end cylindrical portion 11 of the driving means 5, respectively. The outer ends of pin 51 are adapted to have engagement with the inner surface of the radially extending flange 46 of the plate member 45. A flexible bellows 59 is suitably secured to the other or inner end of the shaft 50. The bellows 59 is of known construction and preferably is charged with fluid or vapor expansible upon rise in temperature providing for shifting of the rod 50 axially of the sleeve 21. A suitable end cap 60 is secured within the hub of the impeller against which the bellows 59 may react to cause shifting of rod 50. The cap 60 is formed with an inwardly extending pilot portion 61 for preventing warping or twisting of the bellows. An annular flat metal spring member 63 is carried on the intermediate cylindrical portion 54 of the driving means 5 and is arranged to engage the outer surface of the radial flange 46 of the clutch plate member 45 to normally urge the latter in a direction to disengage the tapered friction surfaces 47 and 48.

The operation of the device above described is as follows: With the parts in the position shown in the drawing the driving means 5 is adapted to be rotated by the belt which drives the hollow sleeve 21 and the impeller 23 carried thereby in the pump chamber 24 to cause circulation of the cooling medium in the circulatory system of the internal combustion engine. The clutch 7 is disengaged so that the driven means 6 comprising the fan 8 is not caused to be rotated. Now, when the cooling medium of the circulatory system reaches a predetermined temperature, i. e., a temperature in excess of the desired operating temperature, the fluid or vapor within the bellows 59 will have expanded and caused the rod 50 to shift axially outwardly or forwardly of the internal combustion engine so that the pin 51 secured in the outer end of rod 50 engages the radially flange portion 46 of the plate member 45, moving the latter axially outwardly against the force of spring 63 to engage the friction or clutch surface 47 thereof with the friction or clutch surface 48 of the driven means 6. The outer end of the coil spring 35 is thus tended to be held against rotation which causes the coil spring to expand radially to clutch the driving means 5 and the driven means 6 together, whereby the fan 8 is caused to effect the flow of a cooling stream of air through a radiator or the like of a circulatory cooling system of an internal combustion engine. Now, if the operating temperature of the cooling medium of the circulatory system drops below the desired predetermined temperature the bellows 59 will contract drawing pin 51 inwardly of the forward end of the engine causing disengagement of the tapered clutch surfaces 47 and 48 of the clutch means 7 and the driving means 6 so that the fan is caused to be disengaged. The spring 63 normally urges the clutch plate member 45 away from the friction surface 48 of the driven means 5 to assure their disengagement when the bellows 59 contracts.

In Figure 2 I have shown a modified construction in which in lieu of the conventional packing ring 32 another conventional form of oil seal 65 has been substituted. The remainder of this embodiment of my invention is the same as described above.

The oil seal 65 is also of a well known type and comprises an outer annular ring member 66 of substantially U-shape in cross-section, which is adapted to fit in the shouldered open end of sleeve portion 18 of the driving means 5. An annular packing ring 67 of substantially L-shape in cross-section is contained within the annular ring member 66 and the leg 68 thereof is held in frictional engagement therewith and extends coaxially of sleeve 14 by means of a garter spring 69 confined between the other leg 70 of the packing ring 67 and the annular disc 71, which in turn is retained within the outer annular ring 66 by the inwardly directed flange at the inner end of the latter. Care should be taken so that the garter spring 68 is of sufficient strength so that it causes a frictional drag to be created between the inwardly extending sleeve 14 of the driven means 6, and the outwardly directed annular sleeve 18 of the driving means 5 so that when the coil spring clutch means is disengaged the driven means by reason of the aforesaid frictional engagement of the driving and driven means causes the fan to rotate slowly. This modified form of my invention operates in substantially the same manner as that described in connection with Figure 1 except that there is less likelihood for the fan blades to become broken or bent in that the fan is not stationary or static when the clutch engages the driving and driven means to cause normal rotation of the fan. The frictional drag referred to is preferably only of sufficient amount to avoid having the fan become static, and the slow rotation of the fan is not sufficient to displace any appreciable amount of air or rotate at a speed in which the vibration thereof is objectionable.

While I have shown what I consider to be the preferred embodiments of my invention, it will be understood that various modifications and rearrangements may be made therein without departing from the spirit and scope of my invention.

I claim:

1. In an internal combustion engine having a fluid circulatory cooling system and a pump chamber therefor, the combination of a driving means, a pump adapted to be disposed in said pump chamber and connected to said driving means, driven means carrying a fan for directing a cooling medium for cooling the fluid in said circulatory system, a coil spring clutch between said driving and driven means, and means responsive to the temperature of the fluid in said circulatory system for actuating said clutch.

2. In an internal combustion engine having a fluid circulatory cooling system and a pump chamber therefor, the combination of driving and driven means comprising coaxially extending cylindrical surfaces, a coil spring arranged between said driving and driven means and fixed at one of its ends to one of said means, a pump adapted to be driven by said driving means and disposed in said pump chamber, a fan adapted to be driven by said driven means, and thermally responsive means carried by said driving means and operable to cause the coil spring to engage said surfaces to clutch said driving and driven means together for conjoint rotation at a predetermined temperature of the fluid in said pump chamber.

3. In an internal combustion engine having a fluid circulatory cooling system and a pump chamber therefor, the combination of a driving means, a pump adapted to be disposed in said pump chamber and adapted to be driven by said driving means, driven means, a fan for directing a cooling medium for cooling the fluid in said circulatory system and adapted to be driven by said driven means, said driving and driven means being formed with coaxially extending surfaces arranged in spaced apart and overlapping relation, a coil spring between the surfaces of said driving and driven means and being fixed at one end to one of said means, a clutch plate at the other end of said coil spring and having a clutch surface, said driven means having a clutch surface adapted to be engaged by the clutch surface of said clutch plate, thermally responsive means disposed in said circulatory system and adapted upon a predetermined temperature of the fluid therein for moving said clutch plate to engage the friction surface thereof with the last named friction surface of said driven means, whereby said coil spring is caused to radially expand to clutch said driving and driven means together for conjoint rotation.

4. In an internal combustion chamber having a fluid circulatory cooling system and a pump chamber therefor, the combination of driving means, a pump adapted to be disposed in said pump chamber and drivingly connected to said driving means, driven means, a fan for directing a cooling medium for cooling the fluid in said circulatory system and drivingly connected with said driven means, clutch means between said driving and driven means, and temperature responsive means having an expansible bellows disposed in said pump chamber and adapted upon a predetermined temperature of the fluid in said circulatory system to actuate said clutch means to clutch said driving and driven means together for conjoint rotation.

5. In an internal combustion engine having a fluid circulatory cooling system and a pump chamber therefor, the combination of driving means, a pump adapted to be disposed in said pump chamber and drivingly connected to said driving means, driven means, a fan for directing a cooling medium for cooling the fluid in said circulatory system and drivingly connected with said driven means, said driving and driven means being formed with coaxially extending cylindrical clutch surfaces arranged in spaced apart and overlapping relation, clutch means between said cylindrical clutch surfaces of said driving and driven means, and a temperature responsive means including an expansible bellows adapted upon a predetermined temperature of the fluid in said circulatory system to actuate said clutch means to engage said clutch surfaces and clutch said driving and driven members together for conjoint rotation.

6. In an internal combustion engine having a fluid circulatory cooling system and a pump chamber therefor, the combination of driving means, a pump adapted to be disposed in said pump chamber and drivingly connected to said driving means, driven means, a fan for directing the cooling medium for cooling the fluid in said circulatory system and drivingly connected with said drive means, said driving and driven means comprising coaxially extending cylindrical surfaces arranged in spaced apart and overlapping relation, a coil spring clutch arranged between said driving and driven means and fixed at one of its ends to one of said means, and a temperature responsive means including an expansible bellows adapted upon a predetermined temperature of the fluid in said circulatory system to actuate said coil spring clutch to engage said clutch surfaces and clutch said driving and driven members together for conjoint rotation.

7. In an internal combustion engine having a fluid circulatory cooling system and a pump chamber therefor, the combination of driving means, a pump adapted to be disposed in said pump chamber and drivingly connected to said driving means, driven means, a fan for directing a cooling medium for cooling the fluid in said circulatory system and drivingly connected with said driven means, said driving and driven means comprising coaxially extending cylindrical surfaces arranged in overlapping and spaced apart relation, clutch means including a coil spring arranged between said driving and driven means and fixed at one of its ends to one of said means, and temperature responsive means comprising a rod extending coaxially of said driving and driven means, and expansible bellows at one end of said rod and adapted to be disposed in said pump chamber, a pin extending transversely of said rod adjacent its other end, said flexible bellows being expansible upon a predetermined temperature of the fluid in said pump chamber for moving said rod axially to engage the pin at the end thereof with said clutch means whereby said coil spring is caused to be radially expanded into engagement with the cylindrical clutch surface of said driven means to clutch said driving and driven means together for conjoint rotation.

8. In an internal combustion engine having a fluid circulatory cooling system and a pump chamber therefor, the combination of driving means, a pump adapted to be disposed in said pump chamber and drivingly connected to said driving means, driven means, a fan for directing a cooling medium for cooling the fluid in said circulatory system and drivingly connected with said driven means, said driving and driven means comprising coaxially extending cylindrical surfaces arranged in spaced apart and overlapping relation, a coil spring arranged between the cylindrical surfaces of said driving and driven means and fixed at one of its ends to one of said means, a clutch plate at the other end of said coil spring and having a clutch surface, said driven means having a clutch surface adapted to be engaged by the clutch surface of said clutch plate, and a temperature responsive means comprising a rod extending coaxially of said driving and driven means, an expansible bellows at one end of said rod and adapted to be disposed in said pump chamber, a pin extending transversely of said rod adjacent its other end, said flexible bellows being expansible upon a predetermined temperature of the fluid in said pump chamber for shifting said rod axially outwardly thereof to engage the pin at the other end of the latter with said clutch plate to cause the friction surface thereof to engage the friction surface of said driven means whereby said coil spring is caused to be expanded radially to engage the cylindrical surface of said driven means to clutch said driving and driven means together for conjoint rotation.

9. The combination of claim 3 characterized by the provision of spring means associated with the driving means for normally urging the clutch plate in a direction to disengage the clutch surface thereof with the clutch surface of the driven means.

10. The combination of claim 8 characterized by the provision of spring means associated with the driving means for normally urging the clutch plate in a direction to disengage the clutch surface thereof with the clutch surface of the driven means.

11. In a fluid circulatory system for an internal combustion engine or the like, the combination of driving means, driven means carrying a fan for directing a cooling medium for cooling the fluid in said circulatory system, a coil spring clutch connected to one of said means, means responsive to the temperature of the fluid in said system for actuating said clutch, and means for frictionally engaging said driving and driven means where said clutch means is disengaged, whereby said driven means is prevented from becoming stationary when said driving means is in operation.

12. The combination of claim 8 characterized by said driving means and driving means having coaxially extending and spaced apart sleeve portions, and means disposed between said sleeve portions providing a frictional driving connection between said driving and driven means when said coil spring is in its contracted position.

13. In a fluid circulatory system for an internal combustion engine or the like, the combination of driving means, driven means carrying a fan for directing a cooling medium for cooling the fluid in said circulatory system, said driving and driven means having coaxially extending cylindrical surfaces defining an annular recess therebetween, a coil spring clutch disposed in said annular recess between said driving and driven means and connected at one end to one of said means, and means responsive to the temperature of the fluid in said system for actuating said coil spring clutch.

14. In a fluid circulatory system for an internal combustion engine or the like, the combination of driving means, driven means carrying a fan for directing a cooling medium for cooling the fluid in said circulatory system, said driving and driven means having first coaxially extending cylindrical surfaces defining a first annular recess therebetween, a coil spring clutch disposed in said first annular recess between said driving and driven means and connected at one end to one of said means, means responsive to the temperature of the fluid in said system for actuating said coil spring clutch, said driving and driven means having second coaxially extending cylindrical surfaces defining therebetween a second annular recess, and means disposed in said second annular recess between said driving and driven means to provide a frictional drag between said driving and driven means when said coil spring clutch is disengaged.

HARRY R. GREENLEE.

REFERENCES CITED

The following references are of record in the file of this patent:

UNITED STATES PATENTS

| Number | Name | Date |
|---|---|---|
| 1,433,399 | Modine | Oct. 24, 1922 |
| 1,481,306 | Stuart | Jan. 22, 1924 |
| 1,820,035 | Stokes | Aug. 25, 1931 |
| 1,837,564 | McCaleb | Dec. 22, 1931 |
| 1,900,586 | Rippe | Mar. 7, 1933 |
| 1,921,399 | Roos | Aug. 8, 1933 |
| 1,934,783 | Arteburn | Nov. 14, 1933 |
| 2,022,709 | Embery et al. | Dec. 3, 1935 |
| 2,045,870 | Paton | June 30, 1936 |
| 2,284,938 | Allen | June 2, 1942 |
| 2,381,567 | Bonham | Aug. 7, 1945 |

FOREIGN PATENTS

| Number | Country | Date |
|---|---|---|
| 669,497 | France | 1929 |